United States Patent
Tilahun et al.

(10) Patent No.: US 10,803,443 B2
(45) Date of Patent: Oct. 13, 2020

(54) METHOD AND SYSTEM FOR DESIGNATING A PRIMARY INTERACTIVE DEVICE

(71) Applicant: PAYPAL, INC., San Jose, CA (US)

(72) Inventors: Yoseph Tilahun, San Jose, CA (US); Jan Rosen, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 734 days.

(21) Appl. No.: 15/391,766

(22) Filed: Dec. 27, 2016

(65) Prior Publication Data
US 2018/0181944 A1    Jun. 28, 2018

(51) Int. Cl.
*G06Q 20/32* (2012.01)
*G06Q 20/38* (2012.01)
*G06Q 20/42* (2012.01)

(52) U.S. Cl.
CPC .......... *G06Q 20/327* (2013.01); *G06Q 20/32* (2013.01); *G06Q 20/385* (2013.01); *G06Q 20/42* (2013.01)

(58) Field of Classification Search
CPC ...... G06Q 10/06; G06Q 10/087; G06F 3/014; G06F 9/541
See application file for complete search history.

(56) References Cited

U.S. PATENT DOCUMENTS

| | | | | |
|---|---|---|---|---|
| 5,793,032 A * | 8/1998 | Bard | ........... | G04B 37/0016 235/462.15 |
| 5,873,070 A * | 2/1999 | Bunte | ........... | G02B 27/017 235/385 |
| 5,898,161 A * | 4/1999 | Devita | ........... | G04B 37/0016 235/462.44 |
| 6,003,774 A * | 12/1999 | Bard | ........... | G04B 37/0016 235/462.45 |
| 8,364,547 B2 * | 1/2013 | Metzger | ........... | G06Q 10/087 705/26.1 |
| 8,376,226 B2 * | 2/2013 | Dennard | ........... | G06Q 30/02 235/375 |
| 8,543,948 B2 * | 9/2013 | Landers, Jr. | ........... | H04L 67/28 716/100 |
| 8,966,019 B2 * | 2/2015 | Flemming | ........... | G06F 9/541 307/138 |
| 9,625,998 B2 * | 4/2017 | Tsai | ........... | G06F 3/017 |
| 9,961,058 B2 * | 5/2018 | Mahoney | ........... | H04L 63/08 |
| 10,453,047 B2 * | 10/2019 | Hicks | ........... | G06K 7/1098 |
| 10,564,841 B2 * | 2/2020 | Rakshit | ........... | G06F 3/04883 |
| 10,565,546 B2 * | 2/2020 | Pugh | ........... | G06Q 30/0222 |
| 2006/0214000 A1 * | 9/2006 | Lapstun | ........... | G06F 3/014 235/462.44 |
| 2007/0228163 A1 * | 10/2007 | Schon | ........... | G06Q 10/06 235/383 |

(Continued)

FOREIGN PATENT DOCUMENTS

WO    WO2015094222    *    6/2015    ............ G06F 3/01

*Primary Examiner* — Daniel S Felten
(74) *Attorney, Agent, or Firm* — Haynes and Boone, LLP

(57) ABSTRACT

Aspects of the present disclosure involve a system and method for identifying a primary interactive device. The current disclosure presents a system and method that after determining devices available to a user, identifies based on an interaction state of each device available, the device that most optimally may be used for providing notifications, and presenting information to a user.

20 Claims, 5 Drawing Sheets

(56) References Cited

U.S. PATENT DOCUMENTS

| | | | |
|---|---|---|---|
| 2015/0149924 A1* | 5/2015 | Tsai | G06F 1/163 |
| | | | 715/748 |
| 2015/0177939 A1* | 6/2015 | Anderson | G06F 3/017 |
| | | | 715/745 |
| 2018/0357845 A1* | 12/2018 | Berg | H04L 63/108 |

* cited by examiner

METHOD AND SYSTEM FOR DESIGNATING A PRIMARY INTERACTIVE DEVICE

TECHNICAL FIELD

The present disclosure generally relates to communication devices, and more specifically, to designating a primary interactive communication device.

BACKGROUND

Rapid advancements in technology and communications have led to the ubiquitous use of wireless electronics. As such, today's society has grown to become heavily device reliant, with a need to be constantly connected. This reliance has led to a perpetual demand for rapid access to information. As a solution, industry and academia have developed the concept of short range wireless communications for the interconnectivity between multiple devices leading to the proliferation of wearable devices. These devices may be used as secondary devices for accessing information.

For example, consumers can now rely on a watch, a fitness tracker, or the like to be notified of a call. Similarly, a wearable device may provide a transaction code for completing a transaction at a merchant location. Unfortunately, the use of secondary wearable devices often require communication with a primary wireless device for transaction processing and merchant interaction. In other words, a user may need to first interact with the primary portable device in order to designate a merchant location, open an application, and/or initiate the transaction that provides a transaction code on the secondary device. This dependence can be quite cumbersome and frustrating for a user.

Therefore, it would be beneficial if a system were created that designates a primary interactive device that can automatically interact with a user, without the need for an initial communication with the primary device.

Figure 1:
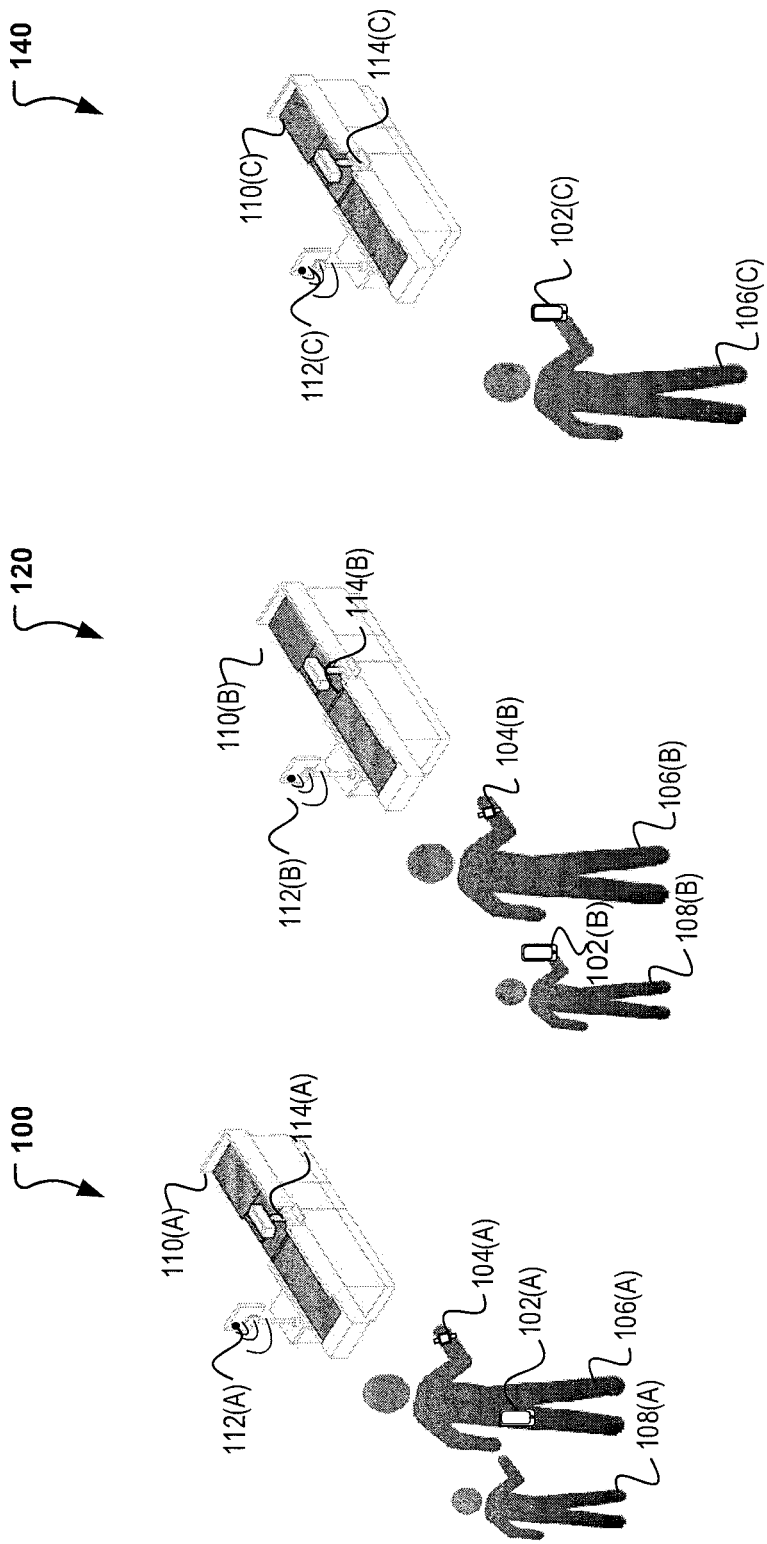
FIG. 1A illustrates a block diagram of a first user interaction with one or more devices for transacting with a merchant.
FIG. 1B illustrates a block diagram of a second user interaction with one or more devices for transacting with a merchant.
FIG. 1C illustrates a block diagram of a third user interaction with one or more devices for transacting with a merchant.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for identifying a primary interactive device. In one embodiment, a system is introduced that can determine the interaction states of all devices available to a user. The interaction states may then be analyzed to determine which device, based on the satisfaction of a criteria, is the most appropriate for interacting with a user.

Rapid advances in communications have made portable electronic devices, such as smartphones and tablets, part of everyday life. Among other things, these electronic devices can be used to browse the web, send and received emails, take pictures, play multimedia content, pay for transactions, etc. However, with the growth in wearable devices, consumers are now dependent on using secondary devices for performing at least some of these tasks. In some instances, in order for the wearable device to be able to perform at least some of the tasks, the wearable device is communicatively coupled, (e.g., tethered) to the user's portable electronic device. It may be said that the smartphone or tablet computer is a primary electronic device for a user, while the wearable electronic device is a secondary electronic device communicatively coupled to the primary electronic device of the user. Note that conventionally, the designation of primary and secondary devices may be up to the user and/or the service provider. More generally, embodiments described herein are directed to communication and interaction between two or more user devices. For example, the primary device can be viewed as the device providing guidance to the secondary device whether though general receipt of information that then gets transmitted to the secondary device and/or as the primary processing device with the secondary device performing tasks as determined by the receiver.

Conventionally, in performing a merchant transaction such as the one illustrated in FIGS. 1A-1C, the first user 106 will approach a merchant checkout stand 110 and if paying using a wearable (or other secondary device) present a payment code (e.g., QR code) on the wearable device for payment that may be scanned or transmitted using short range radio communication. However, such form of payment often requires that the first user 106 provide a communication (e.g., direct input or through the primary device 102) to the wearable device 104 so that the payment code may be generated for display on the wearable device. Such need for manipulation on the primary device may be cumbersome, time consuming, and inefficient for a user interested in providing a quick checkout.

In one embodiment, a system for determining a primary interaction device is disclosed. The primary interaction device can include the mobile device 102 or the wearable device 104 that is designated a primary device for interacting with a user including providing information and notifications. For example, in some instances, a mobile device 104 may be more conveniently available than one or more secondary devices for performing certain transactions and providing notifications. In other instances, one of the secondary devices (e.g., the wearable device) may be more readily available for performing the transaction. In such instances, the appropriate primary device or one of the plurality of secondary devices may be designated the primary interactive device based on the interaction state of the device. In other words, the device more adequately available may be used and designated a primary interactive device to provide the user with the information, transactional code, email update, call notification, etc. at that particular instance without the need for additional manipulation.

FIGS. 1A-1C provide various illustrations of a user at the merchant location preparing to transact while interacting with at least one primary device and at least one secondary device. In particular, FIGS. 1A-1C provide exemplary states of one or more user devices as the user approaches the merchant for performing a transaction. For example, a device state may include a passive state, an inactive state, an active state, etc. In a passive state for example, the device may be passively collecting data (e.g., steps) without experiencing any direct manipulation for a predetermined amount of time while in an active state the device is currently being manipulated.

Note that these Figures and states are examples and shown for illustration purposes only. The Figures may be adapted for use at other stores and situations, for example, at a coffee shop, pharmacy, while at a gym, in a vehicle, etc.

FIG. 1A, for example, illustrates a first user 106(A) and a second user 108(A) at a merchant location en route to a merchant checkout stand 110(A). In this figure, the first user 106(A) is carrying at least two electronic devices (e.g., mobile device 102(A) and a wearable device 104(A)), where the mobile device 102(A) can be the primary device coupled to the wearable device 104(A), which may be designated the secondary device. In some instances, the primary device and secondary device include, but are not limited to, laptops, mobile computing devices, smart phones, tablets, PCs, smart watch, jewelry, etc.

The first user 106(A) may be accompanied by one or more secondary users 108(A). As the users 106(A) and 108(A) approach the merchant checkout stand 110(A), the mobile device 102(A) and the wearable device 104(A) may couple with a wireless communicator 112(A) of the merchant checkout stand 110(A). The wireless communicator 112(A) may communicate over one or more protocols such as Bluetooth®, Bluetooth low Energy®, WiFi, NFC, Wireless LAN, NFC, and/or the like. Further, the merchant checkout stand 110(A) may also include a point of sales (POS) system 114(A). The POS system 114(A) may be configured to interface with the mobile device 102(A), the wearable device 114(A), and/or client device (not shown), for authenticating and conducting payments for goods and services. The POS system 114(A) may also include a card reading device, a QR code reader, or other payment code reader. Note that although the wireless communicator 112(A) and the POS system 114(A) are shown separate, the wireless communicator 112(A) may be integrated with the POS system 114(A) for authenticating and conducting payments over short-range wireless communications or within a predefined distance or area such as within a geofence.

In FIG. 1A devices 102(A) and 104(A), while communicatively coupled to each other, may exhibit two distinct operating states. One device may be operating in a dominant state, while the second device is operating in an active state. For example, FIG. 1A provides an exemplary illustration of the primary device (e.g., mobile device 102(A)) in an inactive state, (located in the first user 106(A) pocket) while the secondary device (e.g., wearable device 104(A) is in a passive state, (reading the first user's biometric data). In this example, the state of the wearable device 104(A) which is passively collecting data, in communication with the POS system, and readily available to the first user 106(A) is more appropriately configured to be designated the primary interaction device which can be used to automatically present a payment source on its display for payment at the merchant checkout stand 110(A), while mobile device 102(A) may remain in a passive mode in the pocket of the first user 106(A).

Alternatively, the primary and secondary devices may be operating in other states. For example, FIG. 1B provides another illustration of a first user 116(B) and a second user 108(A) at a merchant location proceeding towards a merchant checkout stand 110(B) equipped with multiple communication devices. In particular, FIG. 1(B) illustrates the first user 106(B) wearing a wearable device 104(B) while second user 108(B) is carrying a mobile device 102(B). As was the case with FIG. 1A, FIG. 1B includes a merchant checkout stand 110(B) which may include a wireless communicator 112(B) and a POS system 114(B) for conducting authentication and payment of goods and/or services.

In FIG. 1B, wearable device 104(B) may be actively manipulated by the first user 106(B), as first user 106(B) approaches the merchant checkout stand 110(B), while the mobile device 102(B) is also manipulated by the second user 108(B) such that wearable device 104(B) and mobile device 102(B) are in an active state. Alternatively, wearable device 104(B) may be operating in a passive state as the first user 106(B) is walking toward the merchant checkout stand 110(B). However, considering the other states of operation of the devices 102(B) and 104(B) (e.g., second user is actively involved with mobile device 102(B), is at a larger distance from the POS system 114(B), wearable device 104(B) associates first user 104(B) with merchant), wearable device 104(B) may be a good candidate for being designated at the primary interactive device. Therefore, in FIG. 1B, wearable device 104(B) may be designated the primary device used in transacting with the merchant checkout stand 110(B), as the wearable device 104(B) is readily and conveniently available to the first user 106(B), while the mobile device 102(B) although available, is recognized as being actively used by second user 108(B).

FIG. 1C is yet another example of an interaction of a user (first user 106(C)) with a device (e.g., mobile device 102(C)) as the user approaches the merchant checkout stand 110(C) at a merchant location. The merchant checkout stand 110(C) may again include a wireless communicator 112(C) and a POS system 114(C) for authenticating and processing a transaction. In FIG. 1C, the first user 106(C) may be actively interacting with the mobile device 102(C) as the first user 106(C) approaches the proximity of the merchant checkout stand 110(C). Alternatively, FIG. 1C may be an illustration of the first user 106(C) approaching the merchant checkout stand 110(C) with a mobile device 102(C) in hand, while second user (not shown) has stayed in the vehicle surfing the internet on the secondary wearable device.

In this example, mobile device 102(C) may be designated primary interaction device as the system recognizes that mobile device 102(C) is readily available for transacting and a secondary device is not within proximity of the POS system 114(C).

Figure 2:
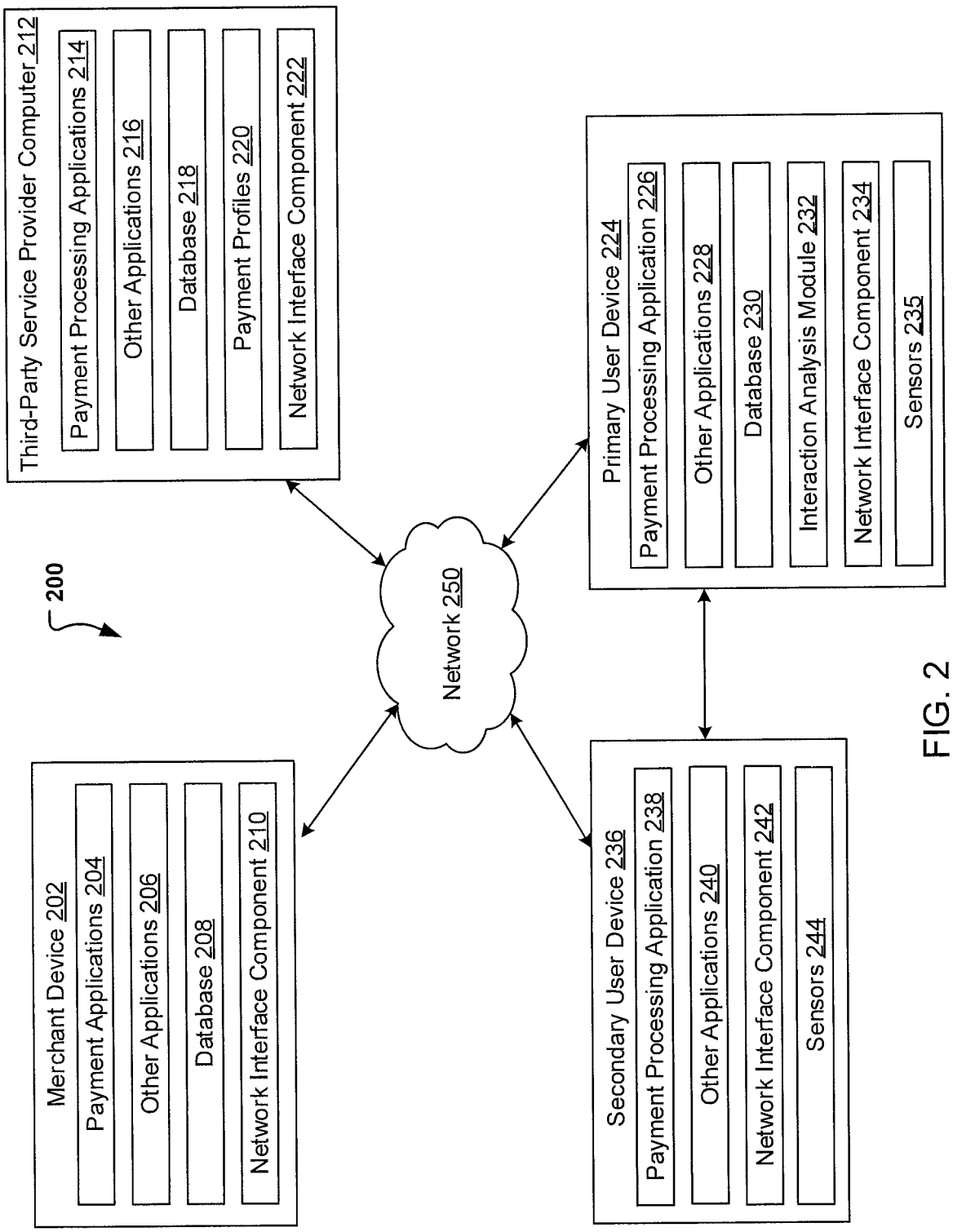
FIG. 2 illustrates a block diagram of a system for designating a primary interactive device.

FIG. 2 is a block diagram of a networked system 200 for implementing the processes described herein, according to an embodiment. In particular, FIG. 2 illustrates a block diagram of a system 200 for designating a primary interactive device. As shown, system 200 may include or implement a plurality of devices, computers, servers, and/or software components that operate to perform various methodologies in accordance with the described embodiments. It will be appreciated that the devices, computers, and/or servers illustrated in FIG. 2 may be deployed differently and that the operations performed and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 200 includes a merchant device 202 (e.g., merchant checkout stand 110), a primary user device 224 (e.g., mobile device 102), a third-party service provider computer 212, and a secondary user device 236 (e.g., wearable device 104) in communication over a network 250. The merchant device 202, primary user device 224, third-party service provider computer 212, and the secondary user device 236 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 200, and/or accessible over network 250.

The merchant device 202 may be implemented as a communication device that may utilize appropriate hardware (e.g. wireless communicator 112) and software configured for wired and/or wireless communication with the primary user device 224, third-party service provider computer 212, and/or secondary user device 236. For example, the merchant device 202 may be implemented as a personal computer (PC), a smart phone, laptop/tablet computer, point-of-sale device, wristwatch with appropriate computer hardware resources, eyeglasses with appropriate computer hardware, other type of wearable computing device, implantable communication devices, and/or other types of computing devices capable of transmitting and/or receiving data. The merchant device 202 may correspond to and be utilized by a user, such as an employee of a merchant and/or another person authorized by the merchant.

The merchant device 202 may include one or more payment applications 204, other applications 206, a database 208, and a network interface component 210. The payment applications 204 and other applications 206 may correspond to executable processes, procedures, and/or applications with associated hardware. In other embodiments, merchant device 202 may include additional or different components having specialized hardware and/or software to perform operations associated with the payment applications 204 and/or the other applications 206.

The payment application 204 may facilitate financial transactions corresponding to the sale of goods and/or services offered by the merchant. For example, the payment application 204 may provide an interface for customers to purchase the goods or services and to receive customer payment information (e.g., customer credit card information). The payment application 204 may further transmit customer payment information to a payment processor (e.g., such as a payment processor corresponding to the third-party service provider computer 212 or the secondary user device 236) to process the customer payment information. The payment application 204 may also facilitate other types of financial transactions such as banking, online payments, money transfer, and/or the like.

The merchant device 202 may execute the other applications 206 to perform various other tasks and/or operations corresponding to the merchant device 202. For example, the other applications 206 may include security applications for implementing client-side security features, programmatic client applications for interfacing with appropriate application programming interfaces (APIs) over network 250, or other types of applications. The other applications 206 may also include additional communication applications, such as email, texting, voice, and instant messaging (IM) applications that enable a user 106 to send and receive emails, calls, texts, and other notifications through the network 250. In various embodiments, the other applications 206 may include location detection applications, such as a mapping, compass, and/or global positioning system (GPS) applications, which may be used to determine a location of the merchant device 202. The other applications may 206 include social networking applications. Additionally, the other applications 206 may include device interfaces and other display modules that may receive input and/or output information. For example, the other applications 206 may include a graphical user interface (GUI) configured to provide an interface to the user.

The merchant device 202 may further include a database 208, which may be stored in a memory and/or other storage device of the merchant device 202. The database 208 may include, for example, identifiers (IDs) such as operating system registry entries, cookies associated with the payment application 204 and/or other applications 206, IDs associated with hardware of the network interface component 210, IDs used for payment/user/device authentication or identification, and/or other appropriate IDs. The database 208 may also include information corresponding to one or purchase transactions of customers who have purchased goods or services from the merchant, browsing histories of the customers, or other types of customer information. In certain embodiments, the merchant device 202 may also include information corresponding to payment tokens, such as payment tokens generated by the third-party service provider computer 212 and/or generated by the secondary user device 236.

The merchant device 202 may also include at least one network interface component 210 configured to communicate with various other devices such as the primary user device 224, the third-party service provider computer 212, and/or the secondary user device 236. In various embodiments, network interface component 210 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth®, Bluetooth low-energy, near field communication (NFC) devices, and/or the like.

The third-party service provider computer 212 may be maintained, for example, by a third-party service provider, which may provide payment processing services for the merchant. In one example, the third-party service provider may be provided by PAYPAL®, Inc. of San Jose, Calif., USA. Alternatively, the third-party service provider computer 212 may be associated with a user of the primary and secondary device 224, 236. As such, the third-party service provider computer 212 includes one or more payment processing applications 214, which may be configured to process payment information received from the merchant device 202 or from a selection at the primary or secondary user device 224, 236. For example, the payment application 204 of the merchant device 202 may receive payment information from a customer to purchase a service or good offered by the merchant. Upon receipt of the payment information, the payment application 204 may transmit the payment information to the third-party service provider computer 212. The payment processing application 214 of the third-party service provider computer 212 may receive and process the payment information. As another example, the payment application 204 can present a payment code on a display of the user device associated with the merchant. The payment code can be scanned or transmitted to the merchant device 202 for payment processing.

The third-party service provider computer 212 may execute the other applications 216 to perform various other tasks and/or operations corresponding to the third-party service provider computer 212. For example, the other applications 216 may include security applications for implementing client-side security features, programmatic client applications for interfacing with appropriate APIs over the network 250, or other types of applications. The other applications 216 may also include additional communication applications, such as email, texting, voice, and IM applications that enable communication of emails, calls, texts, and other notifications through the network 250. In various embodiments, the other applications 216 may include location detection applications, such as a mapping, compass, and/or GPS applications, which may be used to determine a location of the third-party service provider computer 212. Additionally, the other applications 216 may include device interfaces and other display modules that may receive input and/or output information. For example, the other applications 216 may include a GUI configured to provide an interface to one or more users.

The third-party service provider computer 212 may further include a database 218, which may be stored in a memory and/or other storage device of the third-party service provider computer 212. The database 218 may include, for example, IDs such as operating system registry entries, cookies associated with the payment processing application 214 and/or other the applications 216, IDs associated with hardware of the network interface component 222, IDs used for payment/user/device authentication or identification, and/or other appropriate IDs.

According to a particular embodiment, the third-party service provider computer 212 may include a set of payment profiles 220 corresponding to past sales transactions executed by the merchant device 202 with respect to one or more customers of the merchant. Alternatively, the third-party service provider computer 212 may include a set of merchant payment profiles corresponding to the payment sources associated to a corresponding merchant. For example, a particular payment profile from the set of payment profiles 220 may include payment information corresponding to a particular customer of the merchant and/or a merchant associated with a user. The payment information may include credit card information (e.g., card number, expiration date, security code, card issuer, and/or the like), Automated Clearing House (ACH) information (e.g., account number, routing number, and/or the like), identification information associated with the particular customer/user (e.g., a customer identifier, name, address, phone number, date of birth, and/or the like), billing information, and/or any other type of payment information associated with the particular customer. Furthermore, other payment profiles of the set of payment profiles 220 may include payment information corresponding to other customers of the merchant and/or other merchants associated with the user. In addition, the third-party service provider computer 212 may store the set of payment profiles 220 according to a first file format.

The third-party service provider computer 212 may also store a set of payment tokens corresponding to the set of payment profiles 220. For example, each payment profile of the set of payment profiles 220 may be associated with a corresponding payment token from the set of payment tokens. In some embodiments, each payment profile may include a corresponding payment token from the set of payment tokens. The set of payment tokens may be particular to the third-party service provider computer 212 (e.g., computers from other service providers may be unable to use the set of payment tokens) and may enable the merchant device 202 to more securely process payment transactions with the third-party service provider computer 212. For example, in order to process a payment transaction that involves a credit card number associated with a particular payment profile, the third-party service provider computer 212 may provide the merchant device 202 with a particular payment token that is different from the credit card number. The merchant device 202 may use the particular payment token to process the payment transaction instead of the credit card number. Further, the merchant device may store and associate the particular payment token with the particular payment profile instead of the credit card number, thereby protecting the credit card number from being stolen in a potential security breach of the merchant device 202.

In various embodiments, the third-party service provider computer 212 also includes at least one network interface component 222 that is configured to communicate with the merchant device 202, the primary user device 224, and/or the secondary user device 236 via the network 250. Further, the network interface component 222 may comprise a DSL modem, a PSTN modem, an Ethernet device, a broadband device, a satellite device and/or various other types of wired and/or wireless network communication devices including microwave, RF, and IR communication devices.

The primary user device 224 may be implemented as a communication device that may utilize appropriate hardware and software configured for wired and/or wireless communication with the merchant device 202, third-party service provider computer 212, and/or the secondary user device 236. The primary user device 224, may be a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. In one embodiment, the primary user device 224 may be mobile device 102 communicating with wearable device 104 and merchant checkout stand 110.

The primary user device 224 may include a payment processing application 226 that may be used as a digital wallet that can communicate with a merchant device 202, secondary user device 236, and/or third party service provider 212 for purchasing and transacting. The payment processing application 226, can work jointly with database 230 for retrieving bank account information, user accounts, security codes, tokens that may be associated with various merchant locations. Similarly, the payment processing application, can also provide access the user profiles for determining which payment method, processing code, to use at a merchant location.

The primary user device 224 may also include other applications 228 to perform various other tasks and/or operations corresponding to the primary user device 224. For example, the other applications 228 may facilitate communication with the merchant device 202, such as to receive an indication, from the merchant device 202, to switch payment processing services from the third-party service provider to the service provider. As another example, the other applications 228 may include security applications, application that enable designation of a primary interactive device, and applications that allow for web site searches (including access to merchant websites). The other applications 228 may also include additional communication applications, such as email, texting, voice, and IM applications that enable communication of emails, calls, texts, and other notifications through the network 250. In various embodiments, the other applications 228 may include location detection applications, such as a mapping, compass, and/or GPS applications, which may be used to determine a location of the user device 224. The other applications may 228 social networking applications. Additionally, the other applications 228 may include device interfaces and other display modules that may receive input and/or output information. For example, the other applications 228 may include a GUI configured to provide an interface to one or more users.

The primary user device 224 may further include a database 230, which may be stored in a memory and/or other storage device of the primary user device 224. The database 230 may include, for example, identifiers (IDs) such as operating system registry entries, cookies associated with a web browser and/or the other applications 228, IDs associated with hardware of the network interface component 234, IDs used for payment/user/device authentication or identification, bank information, merchant information, user accounts, and/or other appropriate IDs. In addition, the database 230 may include various primary user device states, secondary user device states, and/or a combination of device (e.g., 224, 236) states that may be used in conjunction with predictive analysis module 232 for identifying the primary interactive device.

The primary user device 224 may also include an interaction analysis module 232 which can help in identifying the interaction state of the primary user device 224 and/or secondary user device 236. The interaction analysis module use machine learning algorithms, statistical analysis, predictive analysis, and the like to determine which user device is designated primary interactive device. Further, the interaction analysis module may identify the mode of operation of user devices present as well as receive, organize, weight, and analysis characteristic information received from sensors 235, 244, applications 228, 240 and other modules or applications that may be contemplated. Further, the interaction analysis module 232 may determine appropriate values to give each measured characteristic received from the sensors, GPS unit, processors, etc. For example, high processor usage may receive a larger characteristic value than a processor that is currently dormant. Similarly, a device with coordinates in proximity to or in a geofence of a merchant would be rated greater (receive a larger characteristic value) than a secondary device that has a further proximity to the merchant (e.g., a device with the user in a store vs a device left in a vehicle). The characteristic values received may then be added and compared for each device by the interaction analysis module 232 to a threshold that can be used to determine the most adequate device to designate the primary interactive device.

Primary user device 224, can also be equipped with various sensors 234 to provide sensed characteristics about the primary user device 224 and its environment. For example, the sensors 234 can include a camera for taking images of the surroundings used to determine the information to provide a user (e.g., camera take image of Macy's so a Macy's QR code is presented on the primary interactive device). As another example, the sensors 234 can include microphones for receiving audio signals which can be used to detect location, and other relevant terms that may be spoken. Further, the sensors 234 can include an accelerometer, a light sensor, a biometric sensor, temperature sensor, etc. Each type of sensor providing various characteristics about the device, user, or environment.

The user device 224 may also include at least one network interface component 110 configured to communicate with various other devices such as the merchant device 202, the third-party service provider computer 212, and/or the secondary user device 236. In various embodiments, network interface component 234 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth®, Bluetooth low-energy, near field communication (NFC) devices, and/or the like.

As indicated above, a secondary user device 236 (e.g., 104) may be presently available and used by a consumer (e.g., user 106). The secondary user device 236, much like the primary user device may be equipped with payment processing applications 238 as well as other applications 240. The payment processing applications 238 and other applications 240 may be used to perform various tasks and/or operations corresponding to the secondary user device 236. The other applications 228 may include additional communication applications, such as email, texting, voice, and IM applications that enable communication of emails, calls, texts, and other notifications through the network 250. In addition, the other applications 228 may include location detection applications, such as a mapping, compass, and/or GPS applications, which may be used to determine a location of the secondary user device 236. The other applications may further include 228 social networking applications and device interfaces and other display modules that may receive input and/or output information For example, the applications 238, 240 may facilitate communication with the merchant device 202, such as by presenting a QR code that may be used for making a purchase. As another example, the applications 238, 240 may provide notice of an incoming call or text to the user 106 of the secondary user device 236. Still as another example, the applications 238,240 can provide details on a sale available at a nearby store that is proximate to the user location based on the secondary user device 236 coordinates.

The secondary user device 236 may also include a network interface component 242 for connecting and interacting with at least primary user device 224, merchant user device 202, and/or third-party service provider computer 212 over network 250. The network interface component 242 may comprise a DSL modem, a PSTN modem, an Ethernet device, a broadband device, a satellite device and/or various other types of wired and/or wireless network communication devices including microwave, RF, and IR communication devices.

The network 250 may be implemented as a single network or a combination of multiple networks. For example, in various embodiments, the network 250 may include the Internet or one or more intranets, landline networks, wireless networks, and/or other appropriate types of networks. Thus, the network 250 may correspond to small scale communication networks, such as a private or local area network, or a larger scale network, such as a wide area network or the Internet, accessible by the various components of system 200.

In addition, the secondary user device 236 can also include sensors 244 that may be used for providing measured information about the user, device, location, environment, etc. The sensors can be used to detect light (is device in a pocket), biometric data (is user working out), location (user is in a meeting, call received), etc. Further, the sensors 244 can also be used to determine proximity between devices and location of interest as well as determine processor usage and/or signal strength which may be used to characterize the device for determining the interaction state of the secondary user device 236.

Figure 3:
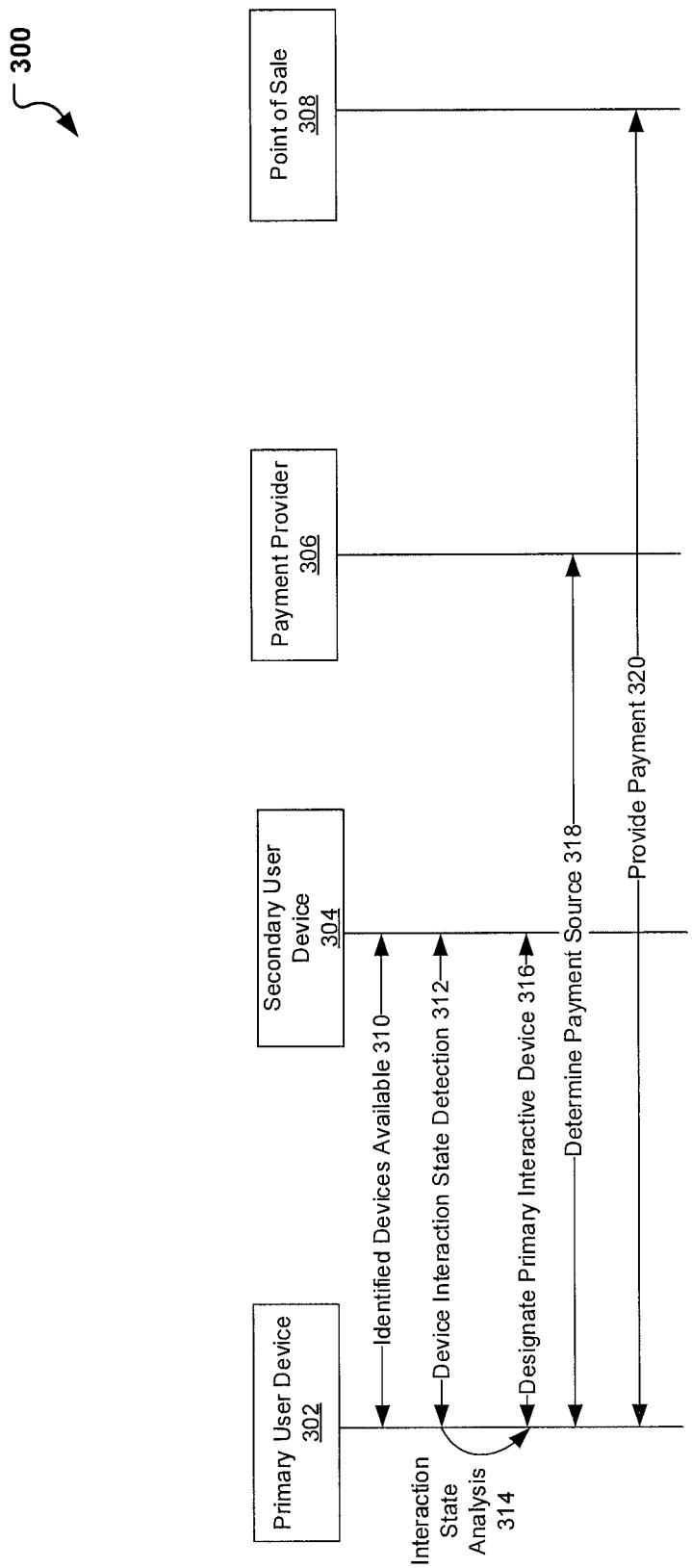
FIG. 3 illustrates a timing diagram of communication between devices for designating a primary interactive device.

FIG. 3 illustrates a timing diagram 300 of a communication between devices 302, 304 for designating and interacting with a primary interactive device. In timing diagram 300, an exemplary interaction with a merchant is illustrated where one of primary user device 302 and secondary user device 304 is designated the primary interactive device. The timing diagram 300 begins with the interaction between primary user device 302 and secondary user device 304. In one example, primary user device 302 can be mobile device 102 and secondary user device 304 can be wearable device 104. The user devices 302, 304 are electrically coupled over a network communication using a short range communication protocol (e.g., BLE, Bluetooth®, NFC). In one instance, primary user device 302 scans for any available devices for communicating with. That is to say, in timing diagram 300, devices available associated with a user are identified 310. In this instance, primary user device 302, identifies secondary user device 304 as being present and establishes a communication link with secondary user device 304.

Once the devices are identified, timing diagram continues with the detection of the device interaction state of each device 312. At this point in time, the interaction state of primary user device 302 and secondary user device 304 are determined. To determine the interaction state of each device 302, 304, a processor such as interaction analysis module 232 from FIG. 2 may be used. As indicated, above, the interaction analysis module may be used to determine interaction states of devices using predictive analysis, probabilistic analysis, machine learning algorithms, point systems, and other computational statistical methods for determining the current status of a device.

In some instances, the interaction state of the device may include a mode of operation in addition to other factors that characterize the current status of the device. For example, the mode of operation may include active, inactive, and passive mode. A device in active mode may include a device that is actively being used and/or is being manipulated. This can include a user surfing the web, a video game being played, media being streamed, transactions being processed, emails read, music played, etc. A device in an inactive mode can include a device that is currently not being used and may be in a power save or sleep status. No real signal processing is occurring, while a device in passive mode may include a device that is passively performing tasks. A device in passive mode may include a device that may be using its sensors and other modules to detect, track, collect information, however may do so without user selection, input, or manipulation.

In addition to the mode of operation, additional factors may be collected and used to determine the current status of the device. For example, as indicated in FIG. 2, primary and secondary user devices 224 and 236 can include sensors 235, 244 for collecting information about the device and its surroundings. As indicated, the sensors 235, 244 can include accelerometers, light sensors, cameras/microphones, etc. These sensors may be used for determining if a device is in a user's pocket, left at a distance in a car/home. Further, other factors that may be measured and used in determining an interaction state of a device, these factors can include signal strength measurement, processor usage, user input, and communication with other external devices (e.g., store beacon, checkout stand wireless communicator 112, etc.).

Once the interaction state of the primary user device 302 and secondary user device 304 is determined an analysis is performed to determine which of the devices should be designated a primary interactive device 314. The analysis can be any examination of the interaction state of the devices and can include, but is not limited to, a comparison of interaction states, a weighted comparison between the mode of operation and characterizing factors, a value given approach in which the device that meets a threshold is selected, and the others of the like. The device determined from the analysis to be the primary interactive device is designated 316 and ready for use as the primary source for communicating, and interacting with the user. As an example, primary user device 302 is designated the primary interactive device in this case.

Note that designation of the primary interactive device may be accomplished by the primary device. In some instances, the designation may automatically occur as the determination is made on which device will be designated. However, in other instances, the device may be designated, after receiving input from a user (or a file, or network device, on a timer/periodic basis, etc.), to interact (e.g., provide email notifications, payment codes, caller identification, etc.) directly with the user.

In timing diagram 300, with the determination of the interaction state of each user device, device coordinates may have been also obtained and/or a communication session established with an external device such as a store beacon or wireless communicator. Provided this information is available, the primary interactive device may determine its current location (e.g., name of store). With knowledge that a user is at a merchant location, (though GPS coordinates, machine learning—habitual visit to coffee shop at same time each day, or user input) the primary interactive device is able to communicate with a payment provider for the reception of an appropriate payment code. As described above, the payment provider may provide payment processing services for the merchant as such, a payment application 204 of the merchant (e.g., at the Point of Sale 308) may prompt the use for a payment code. Alternatively, the payment provider may be associated with a digital wallet of a user, in which case the payment source is determined 318 and provided to the merchant to complete the transaction in timing diagram 320.

Figure 4:
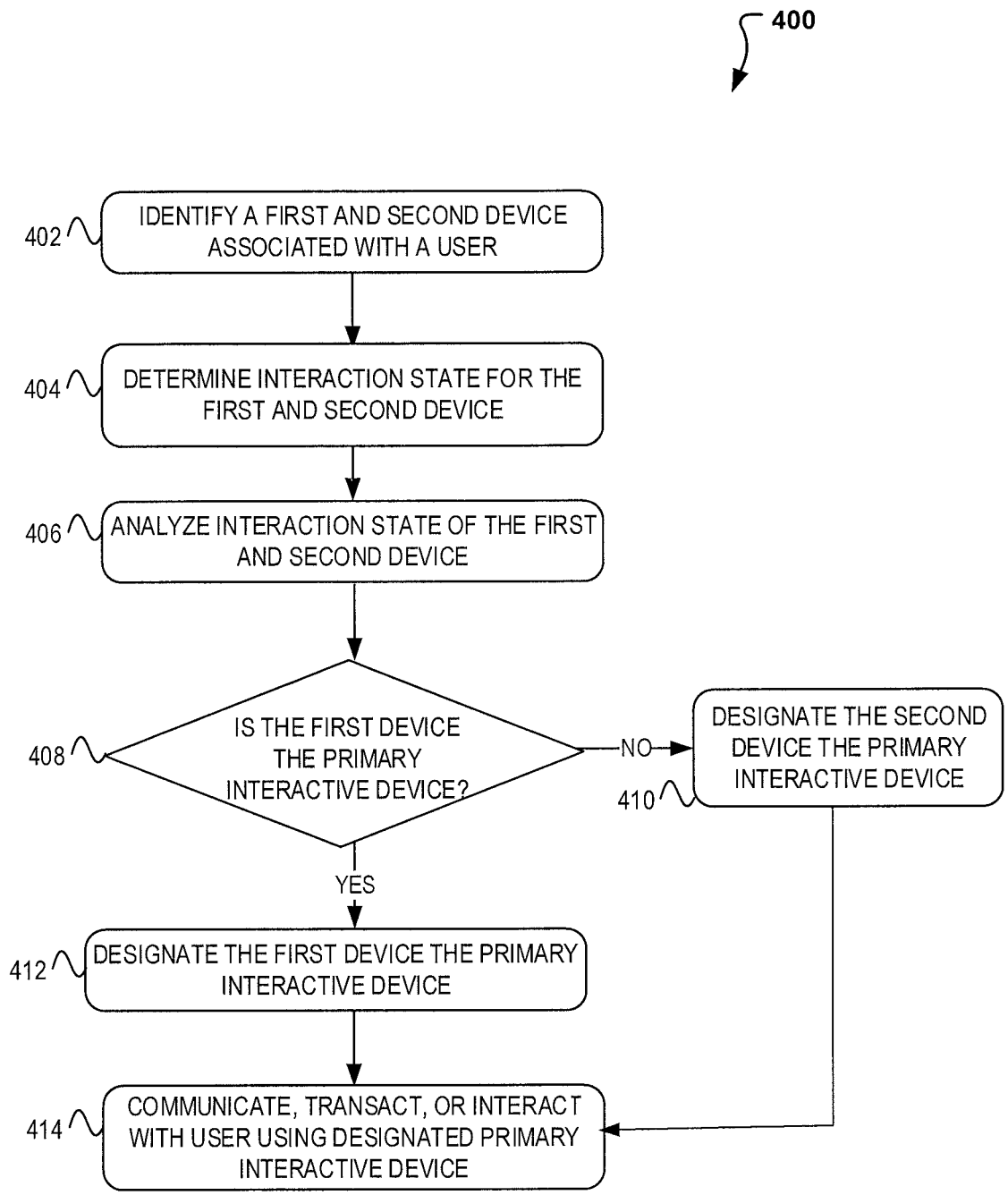
FIG. 4 illustrates a flow diagram illustrating operations for designating a primary interactive device.

FIG. 4 illustrates example process 400 for primary device management that may be implemented by a system such as computing system 200 of FIG. 2 and/or timing diagram 300 of FIG. 3. In particular, FIG. 4 illustrates a flow diagram illustrating operations for designating a primary interactive device. According to some embodiments, process 400 may include one or more of operations 402-414, which may be implemented, at least in part, in the form of executable code stored on a non-transitory, tangible, machine readable media that, when run on one or more hardware processors, may cause a system to perform one or more of the operations 402-414.

Process 400 may begin with operation 402, where two or more device are identified as being associated with a user. The two or more devices may include a primary device and secondary device(s). communications.

Once the devices associated with the user have been identified, process 400 continues to operation 404, where the interaction states of each of the devices is determined. For simplicity, process 400 identifies a first and second device whose interaction states are determined in operation 404. As indicated above and in conjunction with FIG. 3, the interaction state of a device is determined as a function of both the mode of operation of the device in addition to other characteristics that provide an indication as to the current status of the device. For example, the mode of operation of a device can be inactive, passive, and active mode. Additionally, the characteristics that may be used to provide an indication of the current status of the device can include device coordinates, signal strength, processor usage, displacement from other user identified devices, sensor readings, etc. Therefore, once the mode of operation of a device and characteristics regarding the status of the device are known, the device interaction state may be determined. As indicated above, the device interaction state can be determined using predictive analysis, probabilistic analysis, machine learning algorithms, and other computational statistics that may provide an indication as to what interaction state the device is in.

As the interaction state for each device is determined, process 400 continues to operation 406, where the interaction state of the first and second device are analyzed. In some embodiments, the analysis can include a determination as to which device meets a predetermined threshold. The threshold may be predetermined as a point system where various factors/characteristics are given a value. For example, a mobile device with a light sensor, located in a user pocket, may be designated a smaller value as compared to a mobile device that is actively sensing light. Similarly, a mobile device with high processor usage and high accelerometer activity may be given a larger value compared to a mobile device with minimal processor and accelerometer usage. Other characteristics that may also be weighted/given a value include relative distance between devices and location of interest (e.g., is mobile phone carried in-store by user or left behind in the vehicle, etc.). The corresponding values determined for each device may then be tabulated for each device and compared against the predetermined threshold. In some instances, the threshold may be dynamically determined based on the current status of the device, weighted values measured, state of operation of the device, etc. For example, if the device is inactive, then the threshold may automatically be set to a lower value.

In other embodiments, the analysis may include a comparison of the overall interaction state of the first device to the interaction state of the second device. For example, if using predictive analysis it is determined that the first device is a mobile device being used by a child accompanying the parent to a store and that the second device is a smart watch used by the parent. Then, determination can be made the watch may be more appropriate device for payment at a merchant location.

As the interaction states of the first device and the second device are analyzed (e.g., compared against a threshold), the process continues to operation 408 where it is determined whether the first device will be designated the primary interactive device. That is to say, it is determined which device is more appropriate for designating as a primary interactive device. As indicated above, the primary interactive device can be the device that primarily provides information, transactional codes, notifications, etc. to the user. Therefore, if the first device is analyzed and determined to be the most appropriate as the primary interactive device, then the process continues to operation 412 where the first device is designated the primary interactive device. Alternatively, if the second device is analyzed and considered to be the most appropriate for interacting with a user, then process 400 continues to operation 410, where the second device is designated the primary interactive device. Designation can occur on the primary device through an automatic setting. For example, if the determination is made that the secondary device (e.g., wearable device 104) is designated the primary interactive device, then a setting in the primary device (e.g., mobile device 102) may automatically be set that pushes notifications, codes, and other information to the primary interactive device (e.g., the wearable device 104).

Once the designation has been completed, the process 400 continues to operation 414 where the now designated device is used for interacting with the user. That is to say, an email notification, a call notice, a payment code, etc. will be presented to a user on the primary interactive device.

Note that the designation can remain until the interaction state of one or more of the devices changes (or a new device is introduced). That is to say, process 400 may continue to repeat periodically so as to track for any new devices and monitor interaction states of the devices available. Eliminating the need for a user having to manually update or manipulate the device in order to obtain a notification or process a transaction.

Figure 5:
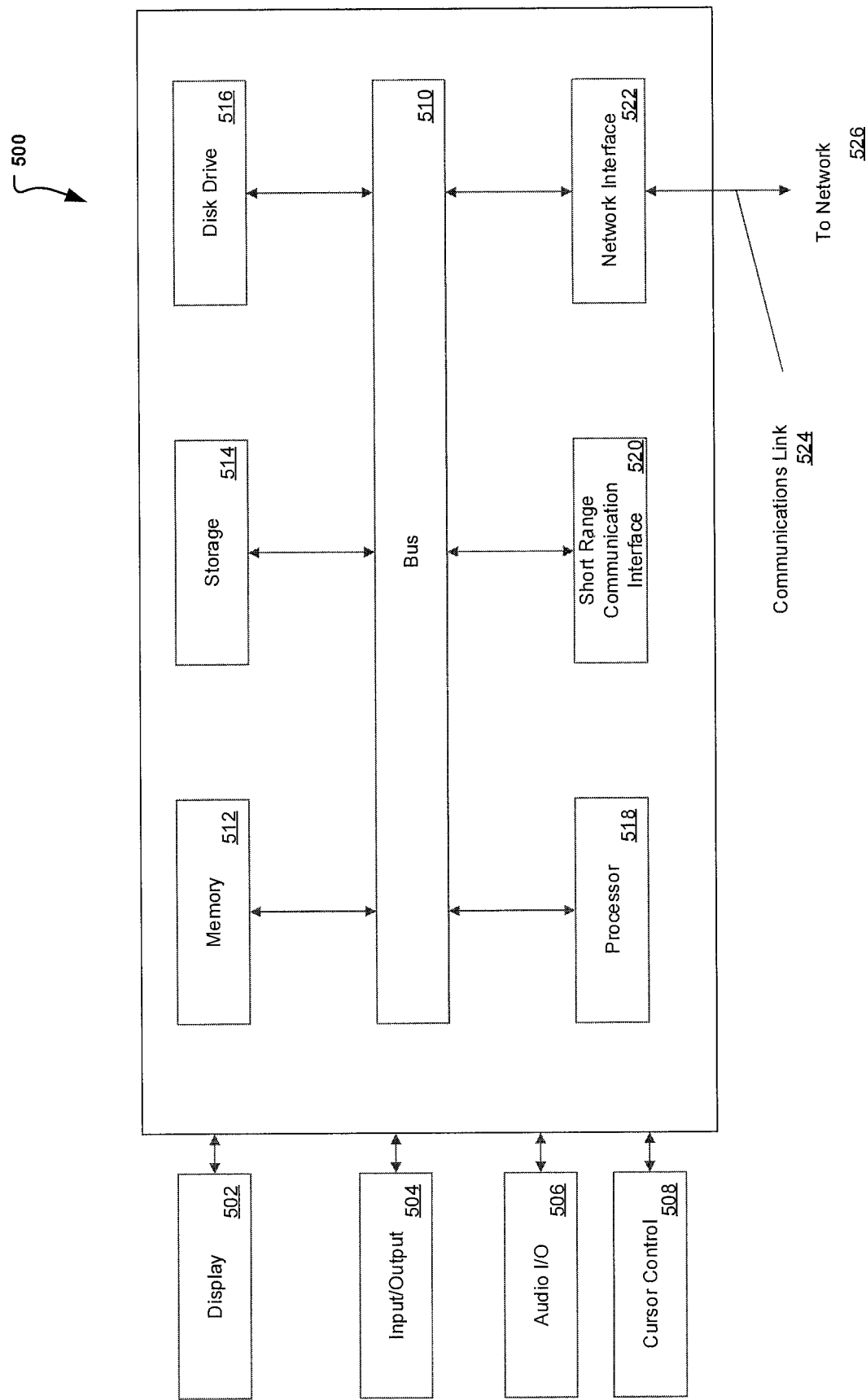
FIG. 5 illustrates an example block diagram of a computer system suitable for implementing one or more devices of the communication systems of FIGS. 1A-1C and 4.

FIG. 5 illustrates an example computer system 500 in block diagram format suitable for implementing on one or more devices of the system in FIG. 2. In various implementations, a device that includes computer system 500 may comprise a personal computing device (e.g., a smart or mobile device 102, a computing tablet, a personal computer, laptop, wearable device 104, PDA, etc.) that is capable of communicating with a network 526. A service provider and/or a content provider may utilize a network computing device (e.g., a network server) capable of communicating with the network. It should be appreciated that each of the devices utilized by users 106, service providers, and content providers may be implemented as computer system 500 in a manner as follows.

Additionally, as more and more devices become communication capable, such as new smart devices using wireless communication to report, track, message, relay information and so forth, these devices may be part of computer system 500. For example, windows, walls, and other objects may double as touch screen devices for users to interact with. Such devices may be incorporated with the systems discussed herein.

Computer system 500 may include a bus 510 or other communication mechanisms for communicating information data, signals, and information between various components of computer system 500. Components include an input/output (I/O) component 504 that processes a user action, such as selecting keys from a keypad/keyboard, selecting one or more buttons, links, actuatable elements, etc., and sending a corresponding signal to bus 510. I/O component 504 may also include an output component, such as a display 502 and a cursor control 508 (such as a keyboard, keypad, mouse, touchscreen, etc.). In some examples, I/O component 504 may include an image sensor for capturing images and/or video, such as a complementary metal oxide semiconductor (CMOS) image sensor, and/or the like. An audio input/output component 506 may also be included to allow a user 106 to use voice for inputting information by converting audio signals. Audio I/O component 506 may allow the user 106 to hear audio. A transceiver or network interface 522 transmits and receives signals between computer system 500 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 518, which may be a micro-controller, digital signal processor (DSP), or other processing component, that processes these various signals, such as for display on computer system 500 or transmission to other devices over a network 526 via a communication link 524. Again, communication link 524 may be a wireless communication in some embodiments. Processor 518 may also control transmission of information, such as cookies, IP addresses, images, and/or the like to other devices.

Components of computer system 500 also include a system memory component 512 (e.g., RAM), a static storage component 514 (e.g., ROM), and/or a disk drive 516. Computer system 500 performs specific operations by processor 518 and other components by executing one or more sequences of instructions contained in system memory component 512. Logic may be encoded in a computer readable medium, which may refer to any medium that participates in providing instructions to processor 518 for execution. Such a medium may take many forms, including but not limited to, non-volatile media, volatile media, and/or transmission media. In various implementations, non-volatile media includes optical or magnetic disks, volatile media includes dynamic memory such as system memory component 512, and transmission media includes coaxial cables, copper wire, and fiber optics, including wires that comprise bus 510. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 500 may also include a short range communications interface 520. Short range communications interface 520, in various embodiments, may include transceiver circuitry, an antenna, and/or waveguide. Short range communications interface 520 may use one or more short-range wireless communication technologies, protocols, and/or standards (e.g., WiFi, Bluetooth®, Bluetooth Low Energy (BLE), infrared, NFC, etc.).

Short range communications interface 520, in various embodiments, may be configured to detect other devices (e.g., primary device 102, secondary device 104, merchant checkout stand 110, etc.) with short range communications technology near computer system 500. Short range communications interface 520 may create a communication area for detecting other devices with short range communication capabilities. When other devices with short range communications capabilities are placed in the communication area of short range communications interface 520, short range communications interface 520 may detect the other devices and exchange data with the other devices. Short range communications interface 520 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 520 may identify a local area network using a short range communications protocol, such as WiFi, and join the local area network. In some examples, computer system 500 may discover and/or communicate with other devices that are a part of the local area network using short range communications interface 520. In some embodiments, short range communications interface 520 may further exchange data and information with the other devices that are communicatively coupled with short range communications interface 520.

In various embodiments of the present disclosure, execution of instruction sequences to practice the present disclosure may be performed by computer system 500. In various other embodiments of the present disclosure, a plurality of computer systems 500 coupled by communication link 524 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 524 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. Thus, "merchant" as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A first device, comprising:
a non-transitory memory storing instructions; and
a processor configured to execute the instructions to cause the first device to:
  detect, over a protocol connection, a second device communicatively coupled to the first device;
  determine a first interaction state of the first device, wherein the first interaction state includes a first one or more characteristics of the first device;
  determine a second interaction state of the second device, wherein the second interaction state includes a second one or more characteristics of the second device;
  analyze, using predictive analysis, a corresponding weight for each of the first one or more characteristics of the first interaction state of the first device and each of the second one or more characteristics of the second interaction state of the second device;
  identify the first device as a primary interactive device based on a satisfaction of one or more criteria from the analyzing; and
  designate, in response to the identifying, the first device as the primary interactive device.

2. The first device of claim 1, wherein the instructions further cause the first device to:
  determine a location of the primary interactive device;
  identify, based in part on the location of the primary interactive device, a payment source to use;
  display a payment code on a display of the primary interactive device corresponding to the payment source; and
  process a transaction at the location of the primary interactive device using the payment code displayed on the primary interactive device.

3. The first device of claim 1, wherein the instructions further cause the first device to:
  present a receipt of an electronic message on a display of the primary interaction device.

4. The first device of claim 1, wherein the first interaction state includes a state of operation, wherein the state of operation is one of an inactive state, an active state, or a passive state.

5. The first device of claim 1, wherein the first one or more characteristics are environmental characteristics measured using one or more sensors on the first device.

6. The first device of claim 1, wherein the instructions further cause the first device to:
  determine that a first amount of a criteria of the first device is greater than a second amount of a criteria of the second device, wherein the first amount of the criteria of the first device is a first function of a first state of operation and the first one or more characteristics, and wherein the second amount of the criteria of the second device is a second function of a second state of operation and the second one or more characteristics.

7. The first device of claim 6, wherein the first one or more characteristics includes at least one of a signal strength, first device coordinates, processor usage, or a distance between the first device and the second device.

8. A method comprising:
  determining, via a first communication session, a presence of a first user device and a second user device;
  analyzing, by an analytic component, a corresponding weight for each of a first one or more characteristics of a first interaction state of the first user device;
  analyzing, by the analytic component, a corresponding weight for each of a second one or more characteristics of a second interaction state of the second user device;
  determining that the first user device is a primary interactive device based in part on a satisfaction of criteria; and
  designating the first user device as the primary interactive device.

9. The method of claim 8, further comprising:
  determining, by a global positioning system unit, a location of the primary interactive device;
  identifying, a payment source to use based in part on the location of the primary interactive device;
  displaying, a payment bode on a display of the primary interactive device, the payment code corresponding to the payment source identified; and
  processing a transaction at the location of the primary interactive device using the payment code displayed on the primary interactive device.

10. The method of claim 8, further comprising:
  presenting a receipt of an electronic message on a display of the primary interactive device.

11. The method of claim 8, wherein the first interaction state and the second interaction state each include a state of operation, and wherein the state of operation is one of an inactive state, an active state, or a passive state.

12. The method of claim 8, wherein the first one or more characteristics are based at least in part on audio signals captured using one or more sensors on the first user device.

13. The method of claim 11, further comprising determining that an amount of criteria of the first user device is greater than an amount of criteria of the second user device, wherein the amount of criteria of the first user device is determined by the first interaction state which includes a combination of the state of operation of the first user device and the first one or more characteristics, and wherein the amount of criteria of the second user device is determined by the second interaction state which includes a combination of the state of operation of the second user device and the second one or more characteristics.

14. The method of claim 12, wherein the first one or more characteristics include a signal strength based on an intensity of the audio signals, first user device coordinates, processor usage, and a distance between the user first device and the second user device.

15. A non-transitory machine-readable medium having stored thereon machine-readable instructions executable to cause a machine to perform operations comprising:

detecting, over a communication session, a second device communicatively coupled to a first device;

determining a first interaction state of the first device, wherein the first interaction state includes a first one or more characteristics of the first device;

determining a second interaction state of the second device, wherein the second interaction state includes a second one or more characteristics of the second device;

analyzing a corresponding weight for each of the first one or more characteristics of the first interaction state of the first device and each of the second one or more characteristics of the second interaction state of the second device;

identifying the first device identified as a primary interactive device based on a satisfaction of one or more criteria from the analyzing; and designating, in response to the identifying, the first device as the primary interactive device.

16. The non-transitory machine-readable medium of claim 15, wherein the first one or more characteristics and the second one or more characteristics include environmental characteristics.

17. The non-transitory machine-readable medium of claim 15, wherein the operations further comprise presenting an email notification on a display of the primary interactive device.

18. The non-transitory machine-readable medium of claim 15, wherein the first one or more characteristics include a signal strength, first device coordinates, processor usage, and a distance between the first device and the second device.

19. The first device of claim 1, wherein the first device is a wearable device.

20. The method of claim 8, wherein the first user device is a mobile device.

* * * * *

UNITED STATES PATENT AND TRADEMARK OFFICE
CERTIFICATE OF CORRECTION

PATENT NO. : 10,803,443 B2
APPLICATION NO. : 15/391766
DATED : October 13, 2020
INVENTOR(S) : Yoseph Tilahun and Jan Rosen Page 1 of 1

It is certified that error appears in the above-identified patent and that said Letters Patent is hereby corrected as shown below:

In the Specification

In the Detailed Description:
In Column 3, Line 66, change "dominant" to --dormant--

In the Claims

In Column 18, Line 36, Claim 9 change "bode" to --code--

Signed and Sealed this
Eighth Day of December, 2020

Andrei Iancu
*Director of the United States Patent and Trademark Office*